US011455517B2

(12) United States Patent
Tolpin et al.

(10) Patent No.: US 11,455,517 B2
(45) Date of Patent: Sep. 27, 2022

(54) POPULATION ANOMALY DETECTION THROUGH DEEP GAUSSIANIZATION

(71) Applicant: PAYPAL, INC., San Jose, CA (US)

(72) Inventors: David Tolpin, Beer Sheva (IL); Amit Batzir, Tel Aviv (IL); Nofar Betzalel, Tel Aviv (IL); Michael Dymshits, Holit (IL); Benjamin Hillel Myara, Tel Aviv (IL); Liron Ben Kimon, Ofaqim (IL)

(73) Assignee: PayPal, Inc., San Jose, CA (US)

( * ) Notice: Subject to any disclaimer, the term of this patent is extended or adjusted under 35 U.S.C. 154(b) by 1372 days.

(21) Appl. No.: 15/794,832

(22) Filed: Oct. 26, 2017

(65) Prior Publication Data

US 2019/0130254 A1    May 2, 2019

(51) Int. Cl.
*G06N 3/04* (2006.01)
*G06N 3/08* (2006.01)

(52) U.S. Cl.
CPC ............. *G06N 3/0472* (2013.01); *G06N 3/08* (2013.01)

(58) Field of Classification Search
CPC ................................ G06N 3/08; G06N 3/0472
See application file for complete search history.

(56) References Cited

U.S. PATENT DOCUMENTS

2007/0255668 A1* 11/2007 Kadambe ............... G06K 9/623
706/20

OTHER PUBLICATIONS

Assendorp (Deep learning for anomaly detection in multivariate time series data, Sep. 2017, pp. 1-83) (Year: 2017).*
Dimokranitou (Adverarial Autoencoders for Anomalous Event Detection in Images, May 2017, pp. 1-32) (Year: 2017).*
Waagen et al. (Random subspaces and SAR classification efficacy, 2005, pp. 256-268) (Year: 2005).*

* cited by examiner

Primary Examiner — George Giroux
(74) Attorney, Agent, or Firm — Haynes and Boone, LLP

(57) ABSTRACT

Anomalies in a data set may be difficult to detect when individual items are not gross outliers from a population average. Disclosed is an anomaly detector that includes neural networks such as an auto-encoder and a discriminator. The auto-encoder and the discriminator may be trained on a training set that does not include anomalies. During training, an auto-encoder generates an internal representation from the training set, and reconstructs the training set from the internal representation. The training continues until data loss in the reconstructed training set is below a configurable threshold. The discriminator may be trained until the internal representation is constrained to a multivariable unit normal. Once trained, the auto-encoder and discriminator identify anomalies in the evaluation set. The identified anomalies in an evaluation set may be linked to transaction, security breach or population trends, but broadly, disclosed techniques can be used to identify anomalies in any suitable population.

20 Claims, 12 Drawing Sheets

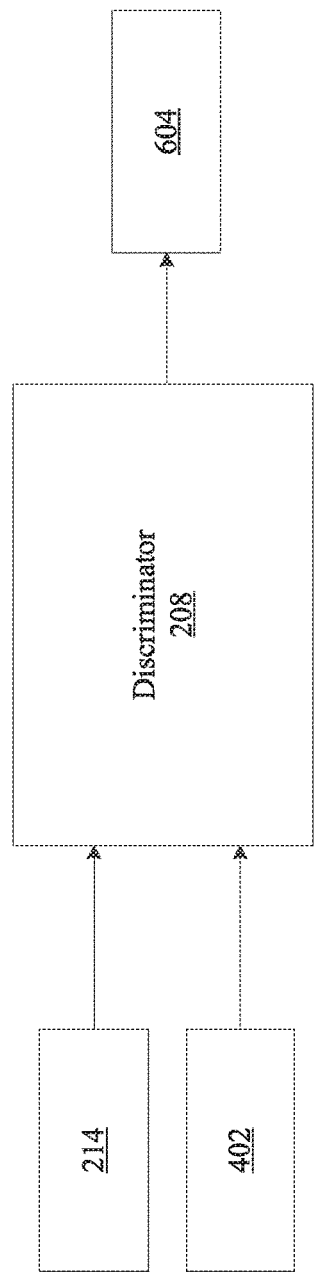

POPULATION ANOMALY DETECTION THROUGH DEEP GAUSSIANIZATION

TECHNICAL FIELD

The disclosure generally relates to neural networks, and more specifically, to using neural networks to detect population anomalies in a population comprising a data set.

BACKGROUND

To detect anomalies in a population data set, conventional anomaly detection techniques use statistical hypothesis testing to detect low-probability outliers. The statistical hypothesis testing, however, may not detect anomalies in the population when individual outliers appear normal in isolation. As such, there is a need for alternative anomaly detection techniques that can detect anomalies in a population data set when individual outliers appear normal.

BRIEF DESCRIPTION OF THE DRAWINGS

FIGS. 6A and 6B are block diagrams of a discriminator, according to an embodiment.

Figure 1:
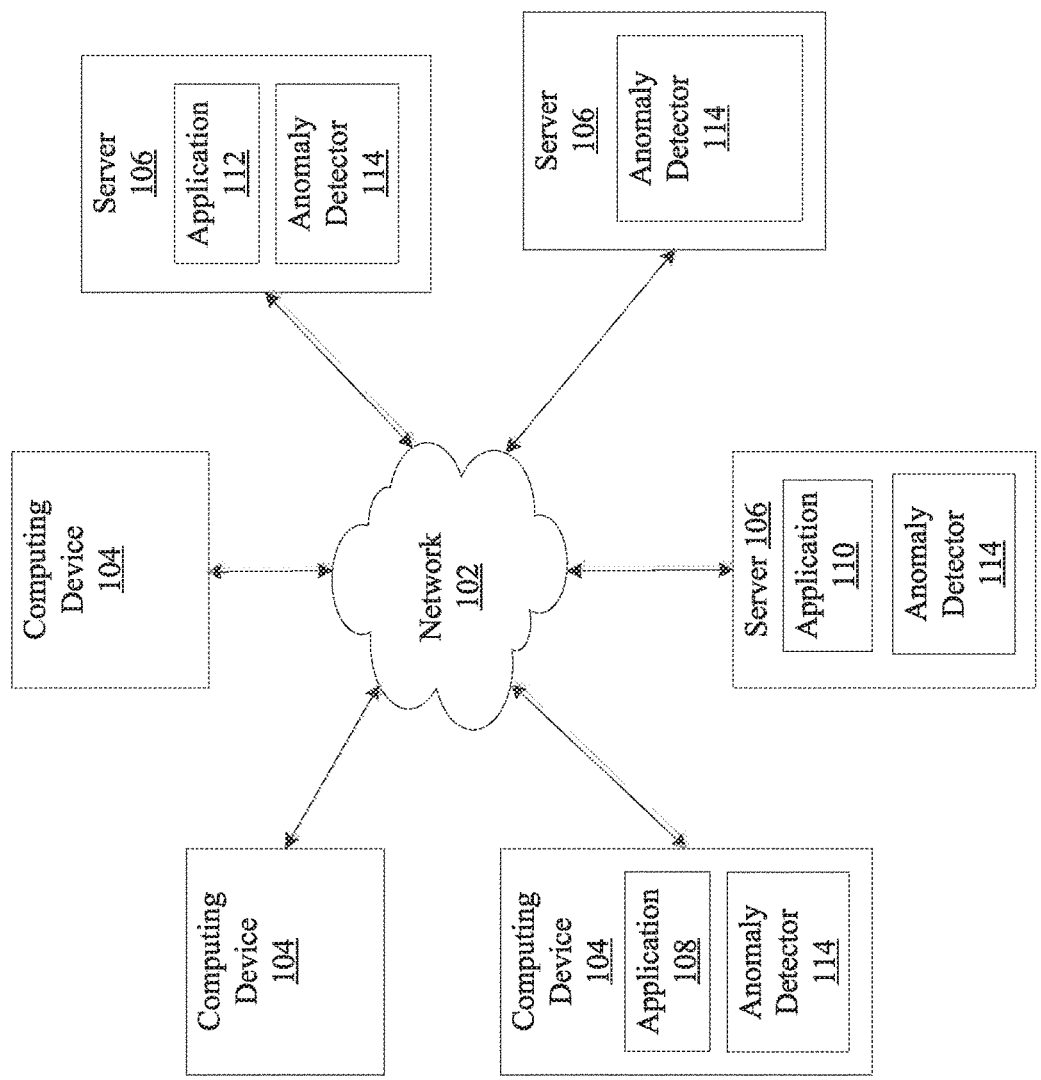
FIG. 1 is an exemplary system where an anomaly detector may be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The systems and methods provide a neural network that serves as an anomaly detector. In an embodiment, the anomaly detector detects fraudulent transactions, fraudulent transaction trends, or breaches in security of a computing system by identifying anomalies in the data set that includes transactions, system calls, etc. Prior to identifying anomalies, the anomaly detector is trained. During training, the neural networks of an auto-encoder and a neural network of a discriminator included in the anomaly detector are trained using a training set that does not include anomalies. The training completes when the auto-encoder generates an internal representation from elements in the training set and then generates elements of the training set from the internal representation with a data loss in the elements of the training set being below a configurable threshold. In an embodiment, the internal representation is a representation of elements from the training set, but from which the elements in the training set can be re-created. The training also completes when the discriminator constrains the internal representation of the training set to a multivariate unit normal of the same dimension.

In an embodiment, during evaluation, the anomaly detector receives an evaluation set that may or may not include anomalies. The evaluation set includes elements that may be attributes of transactions in the evaluation set. The trained auto-encoder generates an internal representation of the evaluation set, where each element of the internal representation is not dependent on other elements of the internal representation. A divergence estimator of an anomaly detector determines a divergence of the internal representation of the evaluation set from the internal representation of the training set by estimating divergence of each axis of the internal representation of the evaluation set to a corresponding univariate unit normal of the multivariate unit normal. Based on divergence of each axis from the univariate unit normal, the divergence estimator estimates probability of an anomaly in the evaluation set.

In an embodiment, the discriminator also determines probability of each element in the internal representation in the evaluation set belonging to the anomaly. To determine the probability of anomaly of each element, the discriminator may be re-trained using the internal representation in the evaluation and the multivariate normal distribution. After the discriminator is re-trained, the discriminator may rank the probability of anomaly of each element in the internal representation of the evaluation set.

In an embodiment, the auto-encoder propagates the rank of each element of the internal representation of the evaluation set to the elements in the evaluation set. Based on the value of the rank of each element in the evaluation set, the anomaly detector determines probability that the element belongs to an anomaly.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network, accessible by the various components of system 100.

Various components that are accessible to network 102 may be computing devices 104 and servers 106. Computing devices 104 may be portable and non-portable electronic devices under control of a user and configured to transmit, receive, and manipulate data from servers 106. Example computing devices 104 include desktop computers, laptop computers, tablets, smartphones, wearable computing devices, eyeglasses that incorporate computing devices, implantable computing devices, etc.

Computing devices 104 may include one or more applications 108. Applications 108 may be pre-installed on the computing devices 104, installed on the computing devices 104 using portable memory storage devices, such as compact disks or thumb-drives, or be downloaded to the computing devices 104 from service provider server that may be one of servers 106, described below. Applications 108 may be executed on the computing devices 104 and receive instructions and data from a user, from servers 106, and/or from other computing devices 104.

Example applications 108 installed on computing devices 104 may be payment transaction applications. Payment transaction applications may be configured to transfer money world-wide, receive payments for goods and services, manage money spending, etc. Further, applications 108 may be under an ownership or control of a payment service provider, such as PAYPAL®, Inc. of San Jose, Calif., USA, a telephonic service provider, a social networking service provider, and/or other service providers. Applications 108 may also be analytics applications. Analytics applications perform business logic, provide services, and measure and improve performance of services and functions of other applications that execute on computing devices 104 based on current and historical data. In another embodiment, applications 108 may be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102. In yet another embodiment, applications 108 may be location detection applications, such as a mapping, compass, and/or global positioning system (GPS) applications. Further, applications 108 may be social networking applications and/or merchant applications. In yet another embodiment, applications 108 may be service applications that permit a user of computing device 104 to receive, request and/or view information for products and/or services, and also permit the user to purchase the selected products and/or services.

In an embodiment, applications 108 may utilize numerous components included in computing device 104 to display, receive input, store data, and communicate with network 102. Example components are discussed in detail in FIG. 11.

As described above, servers 106 are also connected to network 102. An example server may be a computing device that includes hardware and software for large scale processing. In another example, server 106 may be a computer program installed on a computing device that provides services to applications 108 installed on multiple computing devices 104. In an embodiment, server 106 may be maintained by a service provider, such as PAYPAL®, a telephonic service provider, social networking service, and/or other service providers. In an embodiment, server 106 may also include or be coupled with applications 110. Applications 110 may be counterparts to applications 108 executing on computing devices 104. Applications 110 may receive, process, and transmit data for user requested products and/or services transmitted from applications 108. Thus, applications 110 may also be financial services applications configured to transfer money world-wide, receive payments for goods and services, manage money spending, etc. In an embodiment, applications 110 may also be security applications configured to implement server-side security features or programmatic client applications for interfacing with appropriate application programming interfaces (APIs) over network 102. In another embodiment, applications 110 may be communication applications that perform email, texting, voice, and instant messaging functions that allow a user to send and receive emails, calls, texts, and other notifications over network 102. In yet another embodiment, applications 110 may be location detection applications, such as a mapping, compass, and/or GPS applications.

In an embodiment, when application 108 transmits requests and/or data for different transactions to one or more of applications 110, the one or more of applications 110 processes these transactions. The transactions may be in a form of one or more messages that are transmitted over network 102. In a further embodiment, to process transactions requested by applications 108, application(s) 110 may request payment via payment processing application 112. Application 112 may be on the same or different server 106 as application(s) 110. For instance, the payment processing application 112 may receive transactions from applications 108 and/or application(s) 110 that cause the payment processing application 112 to transfer funds of a user using application 108 to a service provider associated with application(s) 110.

In an embodiment, payment processing application 112 may be maintained by a payment provider, such as PAYPAL®, a merchant, financial services provider, credit card provider, bank, and/or other payment provider, which may provide user account services and/or payment services to a user.

In an embodiment, as applications 108, 110, and 112 process user requests, transactions, etc., some user requests, transaction requests, etc., may be fraudulent. However, because individually, each of the requests, transactions, etc., may appear genuine, payment processing application 112 may still process the user requests, transactions, etc. Stated another way, when a particular fraudulent transaction appears to resemble a genuine transaction with sufficient similarity, the fraudulent transaction may be inadvertently approved. Groups of fraudulent transactions, however, can be detected as anomalies in a population of transactions.

To identify fraudulent transactions or fraudulent transaction trends that include multiple fraudulent transactions which individually appear genuine, system 100 may include an anomaly detector 114. Some or all components of anomaly detector 114 may be incorporated into computing device 104, server 106, or a combination thereof. In an embodiment, anomaly detector 114 receives data sets which may comprise transactions generated by applications 108, 110, and/or 112 in some embodiments. Once anomaly detector 114 receives the data sets, anomaly detector 114 identifies anomalies in each data set. These anomalies may identify fraudulent transactions or fraudulent transaction trends that are processed by applications 108, 110, and 112, and that individually appear genuine to applications 108, 110, or 112.

Further, anomaly detector 114 is not limited to transactions from applications 108, 110, and 112. In addition to transactions discussed above, anomaly detector 114 may be used to identify anomalies in banking transactions, credit card transactions, system access events, healthcare transactions, email transactions, network protocol messages, system security calls, and any other types of event driven systems actions that may generate data sets.

In an embodiment, once anomaly detector 114 identifies anomalies in transactions, anomaly detector 114 may cause system 100 to revert the anomalous transactions, stop processing similar transactions in the future, or otherwise prevent the anomalous transactions from being processed by system 100.

Figure 2:
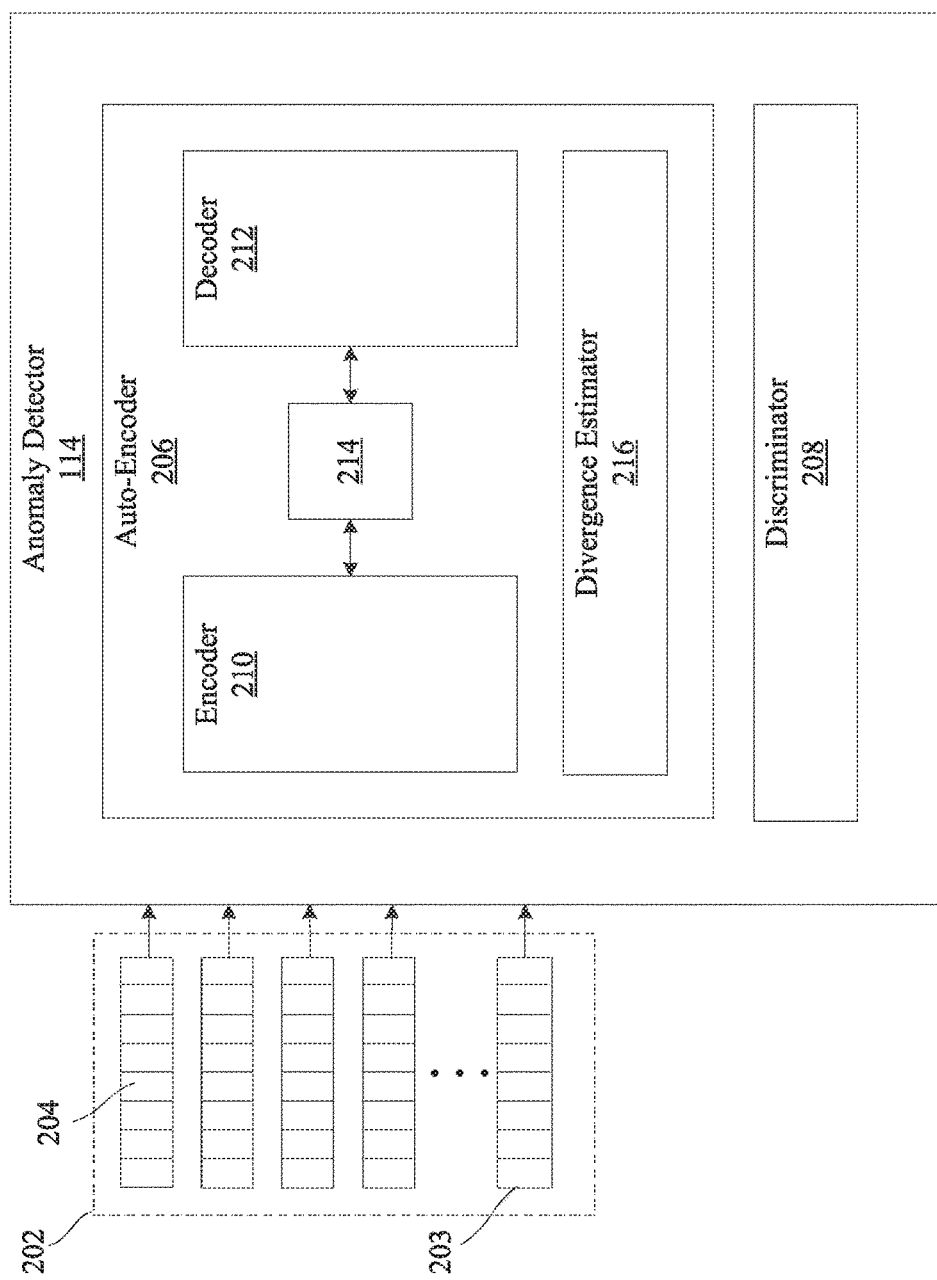
FIG. 2 is a block diagram of an anomaly detector, according to an embodiment.

FIG. 2 is a block diagram 200 of anomaly detector 114, according to an embodiment. Anomaly detector 114 may include one or more neural networks, neural sub-networks or a combination thereof. Neural networks are computing systems comprising multiple layers of inter-connecting nodes that self-learn from observational data. Neural networks receive data as input, pass the input data through one or more layers of inter-connecting nodes and generate output data. Further, each node may include a function or weight that acts on or modifies the data.

In an embodiment the inter-connecting nodes may be trained to pass input data from one node to another and modify data using functions and weights in a way as to generate known output data from known input data. The functions and weights of the inter-connecting nodes may be modified until known input generates the known output. Once trained, the inter-connecting nodes may receive known or unknown input, and use functions and weights to generate a corresponding output.

Unlike conventional anomaly detection systems that use statistical hypothesis testing to detect anomalies using low-probability outliers, anomaly detector 114 uses a gaussianization technique. In the gaussianization technique, anomaly detector 114 may initially be trained on a data set that does not have anomalies. Such a data set may be referred to as a training set. Once anomaly detector 114 is trained on a training set, anomaly detector 114 may receive real-world data sets (such as transactions from applications 108, 110, and 112 described above) which may or may not include anomalies. Each real-world data set may be referred to as an evaluation set. When anomaly detector 114 receives the evaluation set, anomaly detector 114 identifies anomalies in the evaluation data set by determining whether elements in the evaluation set appear with higher or lower probability than similar elements in the training set.

As illustrated in block diagram 200, anomaly detector 114 receives a data set 202 as input. Input data set 202 may be collected over a configurable time interval, such as every minute, hour, week, month, etc. As discussed above, data set 202 may include transactions 203 from applications 108, 110, and 112, or transactions from other event driven systems.

In an embodiment, data set 202 may have multiple elements 204. In some embodiments, elements 204 may be attributes of transactions 203. Example elements 204 for a data set for payment transactions may be user name, user identifier, source address of where transactions were initiated, destination address, source country, destination country, currency, amount, whether transaction was initiated over a computing device, a stationary computing device, a mobile device, etc., whether the transaction was initiated with a particular application (e.g., EBAY), approval tier of a user, payment type, etc. Further, elements 204 are not limited to those embodiments, and may include other elements 204 based on types of data sets 202. Further, elements 204 in data set 202 may or may not depend on other elements 204.

To detect anomalies, anomaly detector 114 includes an auto-encoder 206 and a discriminator 208. In an embodiment, auto-encoder 206 includes an encoder 210 and decoder 212. Encoder 210 and decoder 212 may be neural networks or neural sub-networks of anomaly detector 114.

In an embodiment, encoder 210 receives data set 202 as input. Once received, encoder 210 uses its neural network to transform elements 204 in data set 202 into an internal representation 214 of anomaly detector 114.

In an embodiment, decoder 212 receives internal representation 214 and uses its neural network to reconstruct elements 204 of data set 202 from internal representation 214 with sufficiently high accuracy. A sufficiently high accuracy may be accuracy that is above a configurable accuracy threshold.

In an embodiment, internal representation 214 may be a representation of how data in elements 204 is represented within anomaly detector 114. For example, if data set 202 includes four hundred elements 204, internal representation 214 may represent these four hundred elements 204 as twenty or thirty internally represented elements of internal representation 214 without losing information stored in elements 204. In other words, data stored in elements 204 may be reconstructed from internal representation 214.

In a further embodiment, encoder 210 may generate internal representation 214 such that the elements in internal representation 214 are independent of each other. For example, with respect to credit card transactions, a currency and country may depend on each other, but currency and time of the transaction may not be. Because each element in internal representation 214 is not dependent on other elements in internal representation, each element in internal representation 214 constitutes its own dimension.

Further, internal representation 214 may be a multi-dimensional vector of a configurable dimension. In an embodiment, auto-encoder 206 may determine the dimension of internal representation 214 such that decoder 212 may use internal representation 214 to obtain elements 204 of data set 202. In an embodiment, dimension of internal representation 214 may be the sum of elements included in internal representation 214. The representation of each element in internal representation 214 may be referred to as an axis. Thus, an n dimensional internal representation 214 may have n independent elements and n axes.

In an embodiment, encoder 210 may generate internal representation 214 such that elements included in internal representation 214 are distributed in a multivariate normal distribution or multivariate Gaussian distribution. In multivariate normal distribution, data in each element of internal representation 214 is distributed around the mean value of the data. Further, in a multivariate normal distribution every axis is independent of the other axes. Because every axis is independent, anomaly decoder 114 may identify anomalies along each axis of internal representation 214 by comparing each axis to a corresponding axis of another internal representations 214 generated from a different data set 202. When a discrepancy between the corresponding axes is above a pre-configurable threshold, anomaly detector 114 may indicate an anomaly in the data set, as described below.

Figure 3:
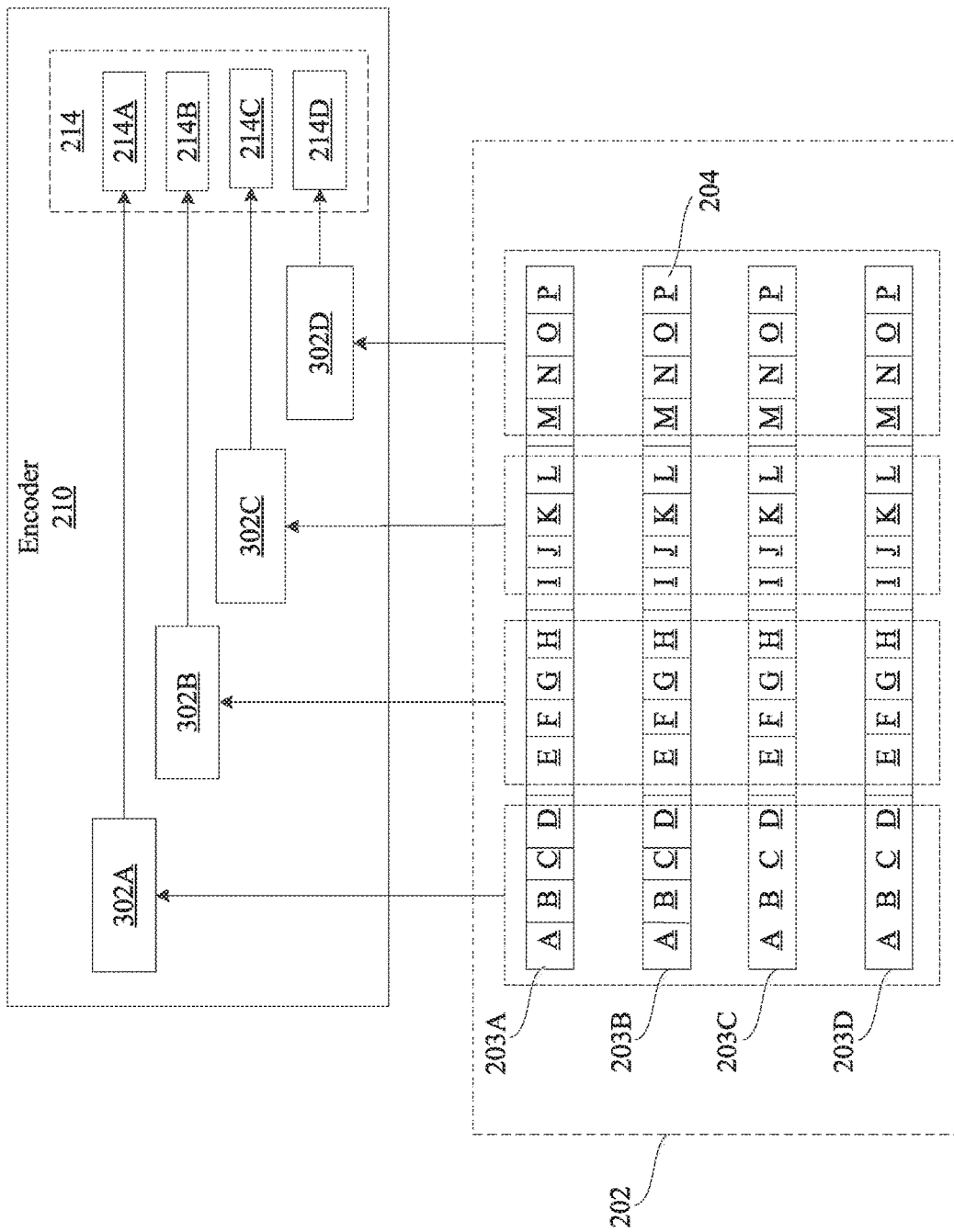
FIG. 3 is a block diagram of an encoder, according to an embodiment.

FIG. 3 is a block diagram 300 of encoder 210, according to an embodiment. Encoder 210 in FIG. 3 generates internal representation 214 from data set 202. As illustrated in block diagram 300, encoder 210 receives data set 202 that includes transactions 203A-D that have been collected over a configurable time interval. Further, each transaction in transactions 203A-D includes elements 204A-P. Once received, encoder 210 separates elements 204 from transactions 203 into buckets 302, such as 302A-D. Encoder 210 may separate elements 204 such that bucket 302A includes elements 204A-D from transactions 203A-D, bucket 302B includes elements 204E-H from transactions 203A-D, bucket 302C includes elements 204I-L from transactions 203A-D, and bucket 302D includes elements 204M-P from transactions 203A-D, in some embodiments.

In an embodiment, encoder 210 may be programmed to normalize values of one or more elements 204. For example, for elements 204 that store a Boolean value, encoder 210 may leave the Boolean value unchanged. In another example, for elements 204 that store categorical fields, encoder 210 may assign a "one-hot" representation to each categorical value, and a designated value to accommodate one or more unknown values. A person skilled in the art will appreciate that a "one-hot" representation is a binary vector where one value is set to one, and remaining values are set to zero. In yet another example, for element 204 that stores a quantitative value, encoder 210 may normalize the value of the quantitative field to a zero mean, unit variance format. In a zero mean, unit variance format, a mean value may be the most repeated value of element 204 and that value may be represented as a zero, and the unit variance may be a difference between the mean value and the value of element 204.

Once encoder 210 normalizes elements 204 of data set 202, encoder 210 converts elements in each bucket 302 to internal representation 214. In an embodiment, encoder 210 may generate internal representation 214 for each bucket 302A-D. For example, encoder 210 may generate internal representation 214A from elements 204A-D in bucket 302A, internal representation 214B from elements 204E-H in bucket 302B, etc.

In yet a further embodiment, encoder 210 generates internal representation 214 as a multivariate unit normal N(0, I). The multivariate unit normal N(0, I) has a multivariate normal distribution, such that each element in internal representation 214 is independent of other elements, and the values of each element are distributed around a mean value for that element.

Going back to FIG. 2, in an embodiment, anomaly detector 114 also includes a discriminator 208. Discriminator 208 is a neural network that performs several functions. First, discriminator 208 receives internal representation 214 generated by encoder 210 and ensures that internal representation 214 has a multivariate unit normal N(0, I) distribution, or is as close to the multivariate unit normal N(0, I) distribution as mathematically possible. Second, discriminator 208 determines whether elements in internal representation 214 include anomalies. Discriminator 208 is further described with reference to the figures below.

As discussed above, anomaly detector 114 may be trained on a training set. The training set may be a data set with known or expected values for elements 204 that have been collected over a configurable period of time. Further, data set 202 that is a training set may not have anomalous transactions or anomalous elements 204. Rather, training set includes elements 204 whose internal representation 214 has a regular distribution.

In an embodiment, during training, encoder 210 is trained to include weights and functions that combine elements 204 of data set 202 into elements of internal representation 214 such that each element of internal representation 214 is independent of other elements of internal representation 214, and thus has its own dimension. Decoder 212, on the other hand, is trained to include weights and functions that receive internal representation 213 and reconstruct elements 204 of the training set from internal representation 214.

Further, dimensionality of internal representation 214 (i.e., number of elements of internal representation 214) may be determined via trial and error, as encoder 210 generates internal representation 214 from the training set. For example, if encoder 210 generates internal representation 214 of a certain dimensionality and decoder 212 then reconstructs the training set from the internal representation 214 with an error above a configurable threshold, encoder 210 may re-generate internal representation 214 with a higher dimensionality that include more independent elements. Encoder 210 and decoder 212 may repeat this process and continue to increase dimensionality of internal representation 214 until decoder 212 may regenerate elements 204 of the training set with an error below a configurable threshold.

In an embodiment, the training set may be designated as $S=\{x \in R^k\}$, where R are real-valued vectors, k is the dimension of the real-valued vectors, x is a sample of independent and identically distributed real-value vectors from an unknown distribution of population $P_0$.

Figure 4:
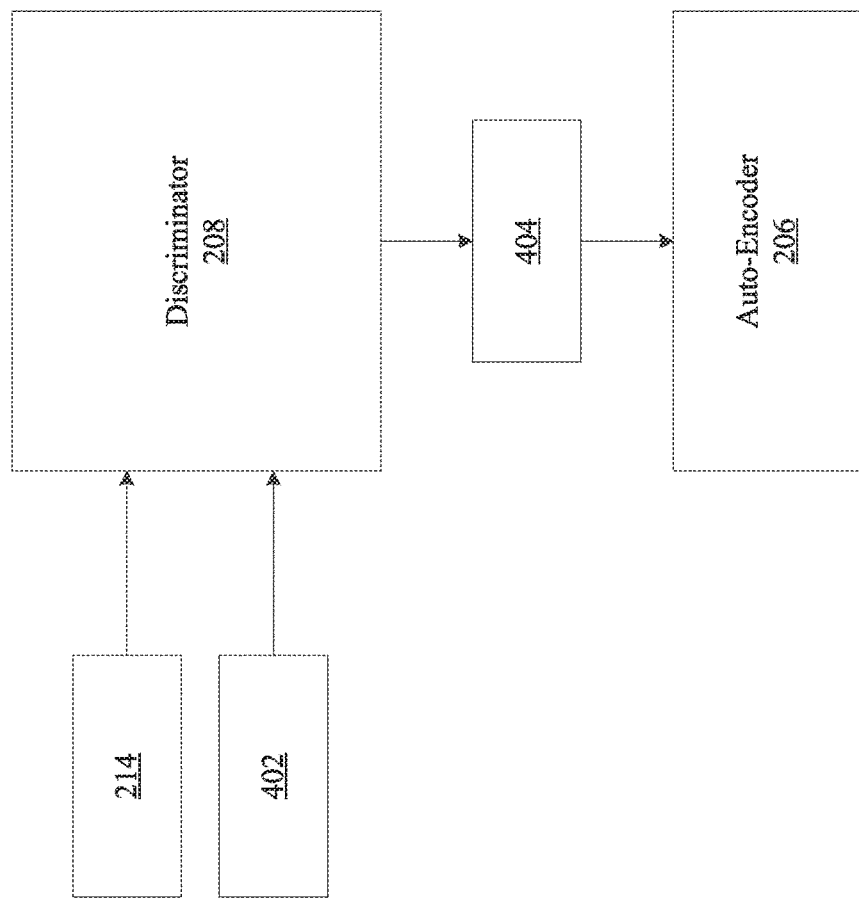
FIG. 4 is a block diagram of a discriminator, according to an embodiment.

As encoder 210 generates internal representation 214 of the training set, discriminator 208 is trained to constrain internal representation 214 of the training set to be as close to a multivariate unit normal N(0, I) as mathematically possible. In an embodiment, FIG. 4 is a block diagram 400 of discriminator 208, according to an embodiment. As illustrated in FIG. 4, discriminator 208 receives a sample from internal representation 214 of the training set and a sample from multivariate normal distribution 402 of the same dimension as internal representation 214. In an embodiment, discriminator 208 is a neural network that acts as a classifier that distinguishes between samples from internal representation 214 of the training set and samples from multivariate normal distribution 402. For example, samples from internal representation 214 of the training set may be classified with a label=1, while samples from multivariate normal distribution 402 may be classified with a label=0. Once discriminator 208 processes samples from internal representation 214 of the training set and multivariate normal distribution 402, discriminator 208 determines quality of classification 404. The quality of classification 404 indicates how much of the output from discriminator 208 that has label=1 is from samples from internal representation 214 and how much of the output from discriminator 208 that has label=0 is from samples of multivariate unit normal.

Once discriminator 208 determines a quality of classification 404, anomaly detector 114 propagates quality of classification 404 to auto-encoder 206.

In an embodiment, auto-encoder 206 may use quality of classification 404 to re-train encoder 210 and re-adjust the weights and/or functions of its nodes such that the neural network of encoder 210 may regenerate internal representation 214 of the training set so that it is further constrained to the multivariate unit normal distribution.

Going back to FIG. 2, in an embodiment, the training of anomaly detector 114 may be complete when encoder 210 may generate internal representation 214 from the training set and decoder 212 may reconstruct the training set from internal representation 214 with a loss below a configurable threshold. Additionally, the training of anomaly detector 114 may be complete when internal representation 214 of the training set is constrained to multivariate unit normal N(0, I) as determined by the discriminator 208.

Once anomaly detector 114 is trained, anomaly detector 114 may determine anomalies in a data set. For example, anomaly detector 114 may receive data set 202 that is a real-world data set. An example real-world data set may include transactions 203 generated by applications 108, 110, and 112. The real-world data set may be referred to as an evaluation set, and may include anomalous transactions or transaction trends.

In an embodiment, the evaluation set may be designated as $S'=\{x'\in R^k\}$ that is drawn from a population having an unknown distribution P' such that P' is a mixture of $P_0$ and an unknown distribution $P_1$ that is different from $P_0$. That is, $D_{KL}(P_0\|P_1)\geq\delta\geq 0$. In the evaluation set S', R are real-valued vectors, k is the dimension of the real-valued vectors, x' is a sample of independent and identically distributed real-value vectors from an unknown distribution of population $P_1$.

As discussed above, distribution of the training set represents regular distribution without anomalies, while distribution of an evaluation set represents distribution that may or may not have anomalies. Thus, if distribution of an evaluation set diverges from the regular distribution of the training set, then anomalies exist in the evaluation set. Further, if the evaluation set diverges from the training set, then the projection of the evaluation set (i.e., internal representation 214 of the evaluation set) will also diverge from the projection of the training set (i.e., internal representation 214 of the training set). By comparing the projection of the evaluation set to the projection of the training set, anomaly detector 114 may detect and quantify population anomalies in the evaluation set.

In an embodiment, encoder 210 may receive data set 202 of the evaluation set, and use its trained neural network to generate internal representation 214 for the evaluation set.

Figure 5:
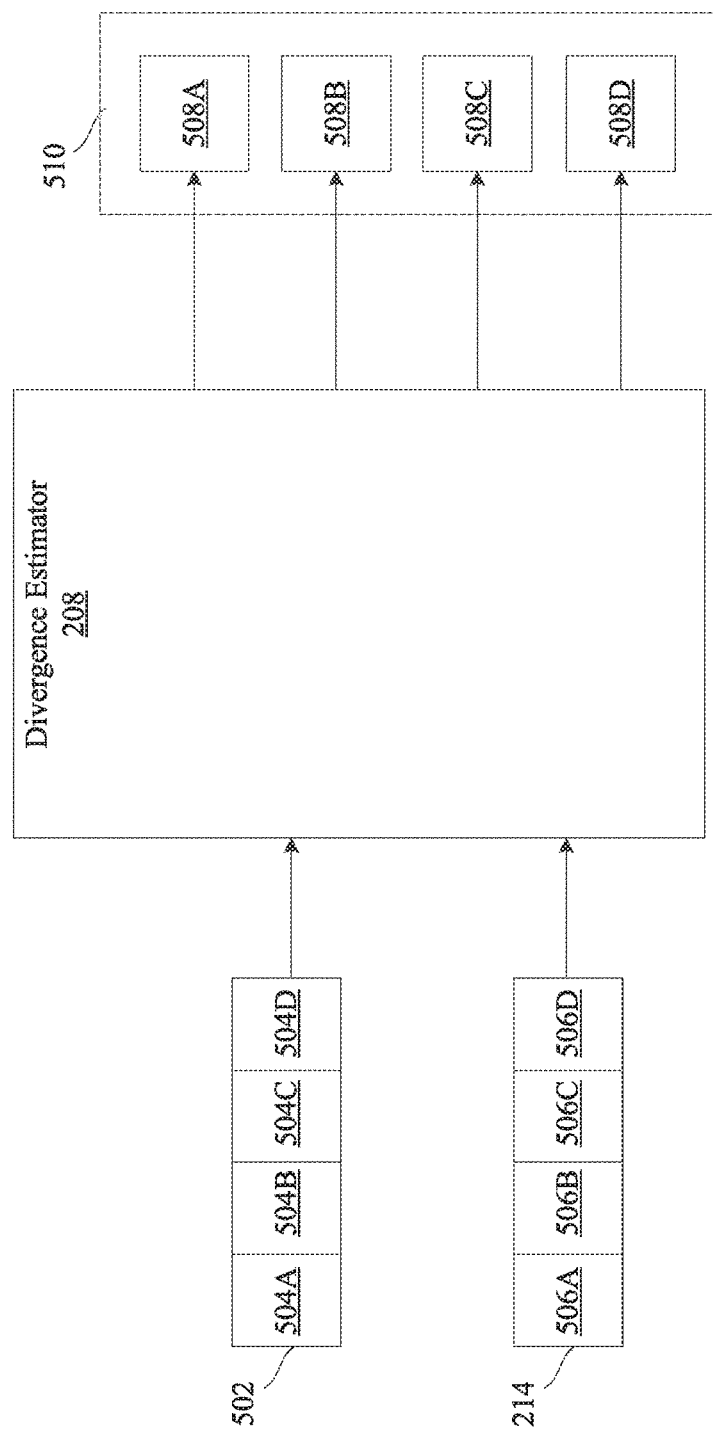
FIG. 5 is a block diagram of a divergence estimator, according to an embodiment.

In an embodiment, FIG. 2 also includes a divergence estimator 216. Divergence estimator 216 determines divergence between internal representation 214 of the evaluation set and internal representation 214 of the training set (which is or is close to a multivariate unit normal N(0, I)). FIG. 5 is a block diagram 500 of divergence estimator 216, according to an embodiment. Divergence estimator 216 receives multivariate unit normal 502 which is an internal representation 214 of the training set and an internal representation 214 of an evaluation set. To determine divergence between multivariate unit normal 502 and internal representation 214 of an evaluation set, divergence estimator 216 estimates divergence between each univariate unit normal in multivariate unit normal 502 (such as univariate unit normal 5042A-D) and a corresponding axis of the internal representation 214 of the evaluation set, such as axis 506A-D. As discussed above, each axis 506 corresponds to an independent element in internal representation 214. For example, divergence estimator 216 may estimate divergence between univariate unit normal 504A and axis 506A, univariate unit normal 504B and axis 506B, univariate unit normal 504C and axis 506C, and univariate unit normal 504D and axis 506D. The divergence estimates between univariate unit normal 504A-D and axis 506A-D are shown as 508A-D.

In a non-limiting embodiment, to estimate divergence between each univariate unit normal of multivariate unit normal 502 and the corresponding axis of the internal representation 214 of the evaluation set, divergence estimator 216 may use Kolmogorov-Smirnov statistics, which are known in the art. In another embodiment, divergence estimator 216 may also use other "goodness-of-fit" statistics that can summarize discrepancy between observed values (such as internal representation 214 of the evaluation set) and expected values (such as multivariate unit normal 502).

In this embodiment, the maximum divergence between univariate unit normal and the corresponding axis of the internal representation 214 of the evaluation set is a number that corresponds to a measure of an anomaly for that axis.

Further, when internal representation 214 of the evaluation set for a particular axis does not contain an anomaly, then the internal representation 214 for that axis will be the same or approximately the same as the corresponding univariate unit normal of multivariate unit normal N(0, I).

In an embodiment, divergence estimator 216 may also generate a divergence estimate 510. Divergence estimate 510 may quantify the odds of an anomaly in the evaluation set. In other words, divergence estimate 510 may be an estimate of divergence between all axes of the training set and all axes of the evaluation set. To determine divergence between the training set and the evaluation set, divergence estimator 216 may add divergences estimates 508A-D over all axes. In an embodiment, for combining divergence estimates 508A-D over all axes, divergence estimator 216 may utilize a p-norm function. Performing calculations using a p-norm function is known to a person of ordinary skill in the art. In an embodiment, divergence estimator 216 may utilize p-norm functions, such as $L^1$ and $L^2$ norm functions. In another embodiment, where anomalies may be caused by small intrusions or perturbations, divergence estimator 216 may use a maximum norm function, such as norm function. Performing calculations using maximum norm functions is also known to a person of ordinary skill in the art.

In addition to determining probability of an anomaly in the evaluation set, anomaly detector 114 may also determine probability of each element 204 of the evaluation set belonging to the anomaly. In an embodiment, discriminator 208 may predict probability of an anomaly of each element 204 in the evaluation set.

To determine probability of anomaly of each element 204, discriminator 208 may generate a rank for each element of internal representation 214 of the evaluation set. This rank may be propagated through decoder 212 to elements 204 of the evaluation set.

In an embodiment, to rank each element of internal representation 214 of the evaluation set, discriminator 208 may be re-trained on the evaluation set to distinguish between internal representation 214 of the evaluation set and samples from multivariate normal distribution. In this way, the more internal representation 214 of the evaluation set diverges from the internal representation 214 of the training set, the higher the classification accuracy may be. As such, elements 204 that are more likely to come from the anomalous component, such as $P_1$, will be classified as anomalous with more confidence.

Figure 6B:
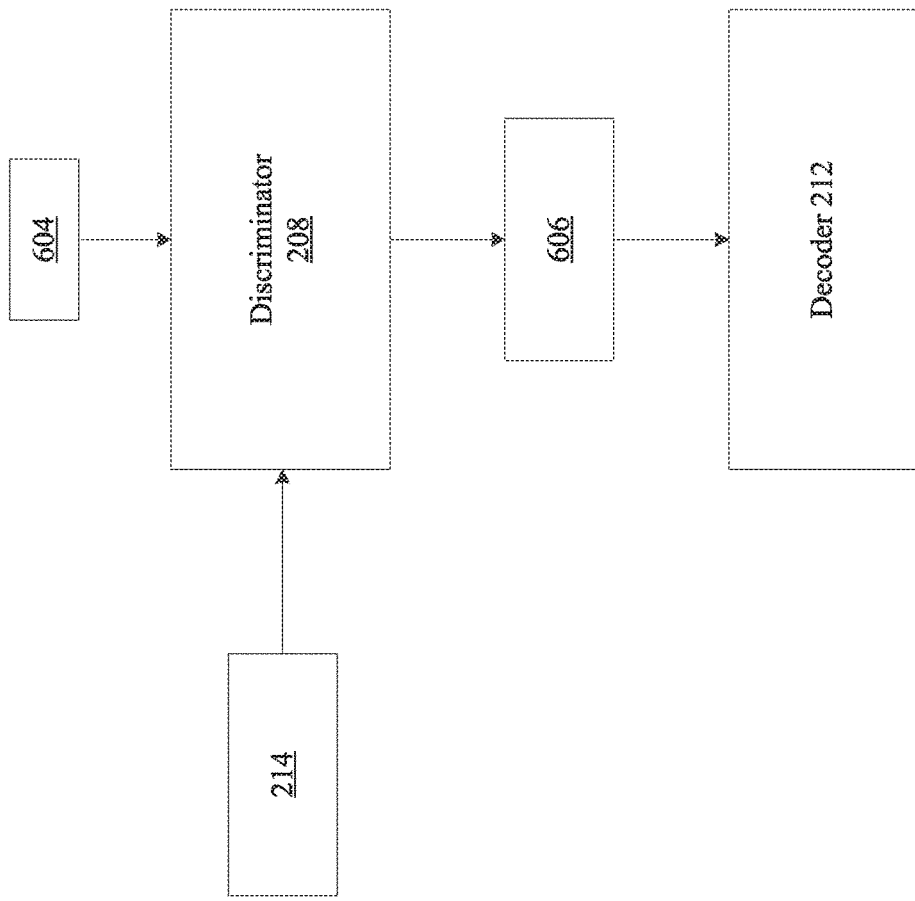

FIGS. 6A and 6B are block diagrams 600A and 600B of discriminator 208, according to an embodiment. FIG. 6A is similar to FIG. 4 discussed above, except discriminator 208 is re-trained using internal representation 214 of the evaluation set rather than internal representation 214 of the training set. To re-train, discriminator 208 uses internal representation 214 of the evaluation set and the same number of random samples from the multivariate normal distribution 402 of the same dimension. In an embodiment, discriminator 208 assigns label=1 to samples from internal representation 214 of the evaluation set and label=0 to samples from multivariate normal distribution 402. As discriminator 208 is being re-trained, discriminator 208 generates classifiers 604 that distinguish whether the source of data is multivariate normal distribution 402 or internal representation 214 of the evaluation set. In an embodiment, classifiers 604 may be weights or functions associated with nodes of the neural network of the discriminator 208. In an embodiment, discriminator 208 may be re-trained several times on the samples of internal representation 214 of the evaluation set and samples from the multivariate normal distribution 402 until classifiers 604 distinguish between the samples of internal representation 214 of the evaluation set and samples from the multivariate normal distribution 402 with accuracy below a configurable threshold.

Once discriminator 208 is re-trained, discriminator 208 may use classifiers 604 to rank elements of internal representation 214 of subsequent evaluation sets. As illustrated in FIG. 6, discriminator 208 receives internal representation 214 of a subsequent or new evaluation set from auto-encoder 206. A subsequent or new evaluation set may be an evaluation set that is different from the evaluation set used to re-train discriminator 208.

In an embodiment, discriminator 208 uses classifiers 604 to rank elements in internal representation 214 of the new evaluation set with a real number ranging from zero to one. If the elements in internal representation 214 of the new evaluation set have a rank 606 that is closer to zero (less than 0.5) or below another threshold number, then the elements have a low probability of being anomalous. On the other hand, if the elements in the internal representation 214 of the new evaluation set have a rank 606 that is closer to one (higher than 0.5) or above another threshold, then the elements have a high probability of being anomalous.

In an embodiment, once discriminator 208 assigns rank 606 to elements in the internal representation 214 of the new evaluation set, decoder 212 may propagate rank 606 assigned to elements of internal representation 214 of the new evaluation set to elements 204 of the new evaluation set. As such, elements 204 with rank 606 closer to one have a high probability of being anomalous, while elements 204 with rank 606 that is closer to zero have a low probability of being anomalous.

Figure 7:
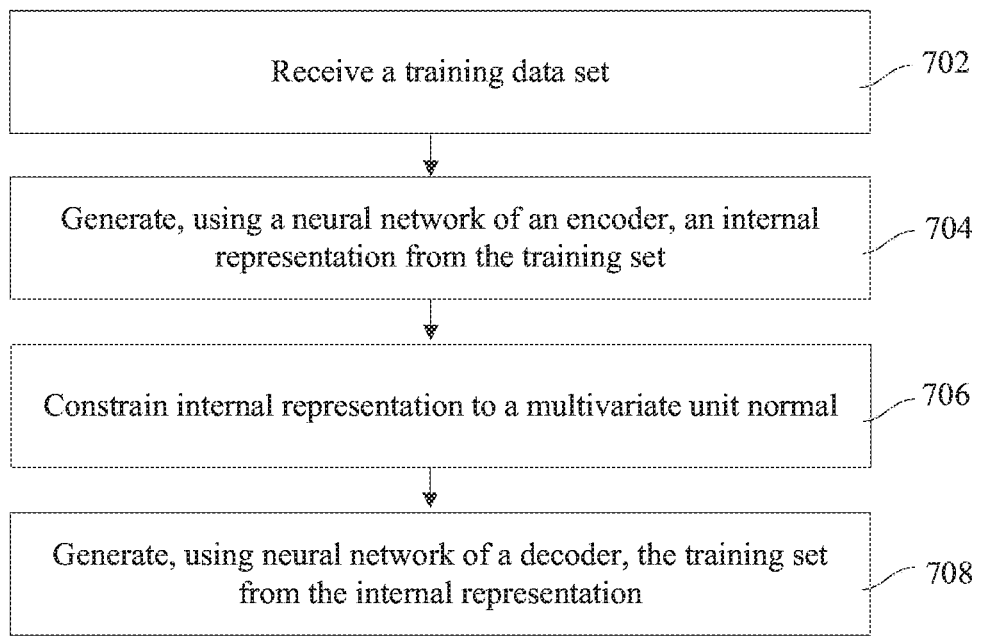
FIG. 7 is a flowchart of a method for training an anomaly detector, according to an embodiment.

FIG. 7 is a flowchart of a method 700 for training an anomaly detector 114, according to an embodiment. Method 700 may be performed using hardware and/or software components described with respect to FIGS. 1-6. Note that one or more of the operations may be deleted, combined, or performed in a different order as appropriate. As described above, anomaly detector 114 may be a neural network that includes multiple layers and multiple nodes, including an encoder neural network (encoder 210), a decoder neural network (decoder 212), and a discriminator neural network (discriminator 208) in some embodiments.

At operation 702, a training set is received. For example, auto-encoder 206 receives a training set, which may be data set 202 that includes elements 204. As described above, the training set may not contain data anomalies.

At operation 704, an internal representation is generated. For example, encoder 210 generates internal representation 214 of elements 204 from the training set. As discussed above, to generate internal representation 214 of the training set, encoder 210 may divide elements 204 into different buckets 302, and generate internal representation 214 for each bucket 302. In an embodiment, each element in internal representation 214 may be independent of other elements of internal representation 214.

At operation 706, an internal representation is constrained by a multivariate unit normal. As discussed above, discriminator 208 uses samples from internal representation 214 of the training set and samples from multivariate normal distribution 214 of the same dimension as the internal representation 214 to constrain internal representation 214 to multivariate unit normal N(0, I). In some embodiments, internal representation 214 may be equal or approximately equal to multivariate unit normal N(0, I).

At operation 708, elements of the data set are recovered. For example, decoder 212 uses internal representation 214 of the training set that is constrained by multivariate unit normal N(0, I) to recover elements 204 of the training set.

In an embodiment, anomaly detector 114 may repeat operations 702-708 on the training set until decoder 212 may recover elements 204 from internal representation 214 that was generated by the encoder 210 using the same elements with a loss below a configurable threshold. In a further embodiment, anomaly detector 114 may repeat operations 702-708 until internal representation 214 of the training set is or approximately equal to multivariate unit normal N(0, I).

Figure 8:
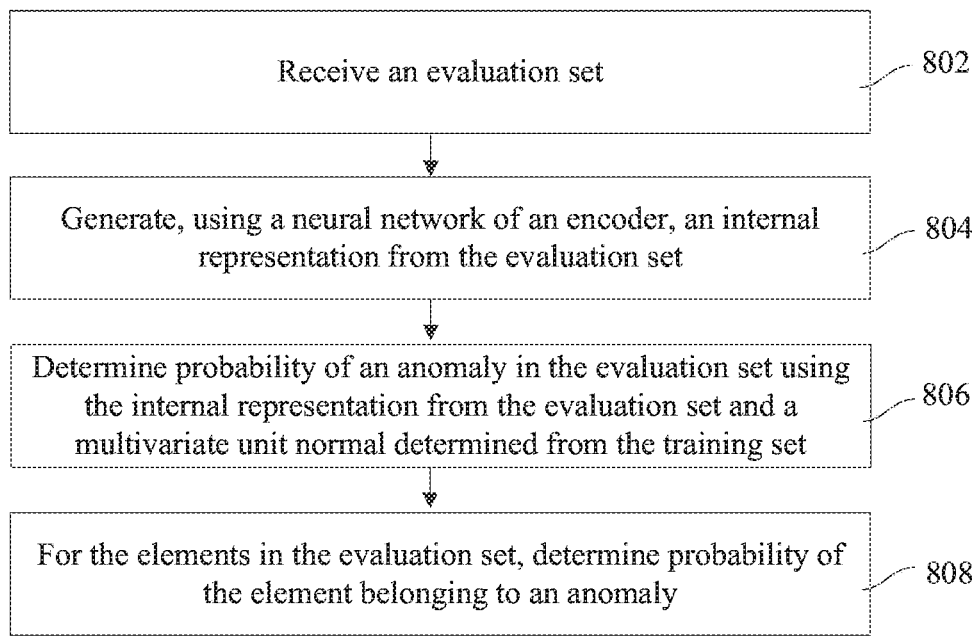
FIG. 8 is a flowchart of a method for determining anomalies in a data set, according to an embodiment.

FIG. 8 is a flowchart of a method 800 for determining anomalies in a data set, according to an embodiment. Method 800 may be performed using hardware and/or software components described with respect to FIGS. 1-6. Note that one or more of the operations may be deleted, combined, or performed in a different order as appropriate. Operations in flowchart 800 may occur after anomaly detector 114 is trained using the training set.

At operation 802, an evaluation set is received. For example, auto-encoder 206 receives an evaluation set. As discussed above, the evaluation set may be data set 202 which may or may not include anomalies. As also discussed above, the evaluation set may have been collected over a configurable time period.

At operation 804, an internal representation is generated. For example, encoder 210 trained as described in FIG. 7, generates internal representation 214 from elements 204 of the evaluation set. As discussed above, to generate internal representation 214, encoder 210 may divide data in the evaluation set into different buckets 302, and generate internal representation 214 from each bucket 302. In an embodiment, each element in internal representation 214 is does not depend on other elements of internal representation 214.

Figure 9:
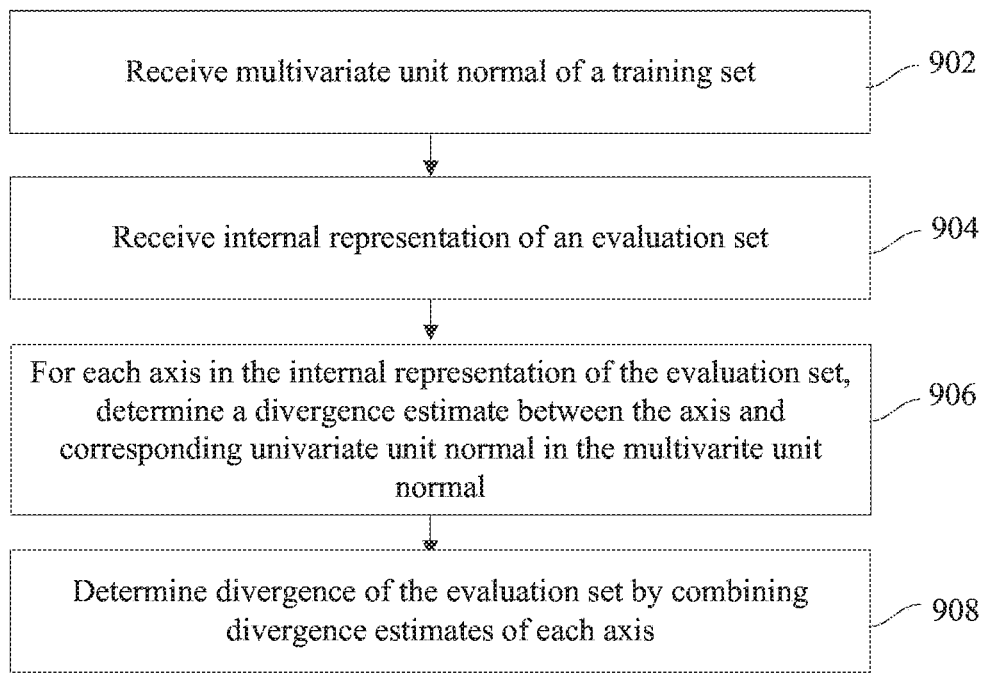
FIG. 9 is a flowchart of a method for estimating divergence, according to an embodiment.

At operation 806, the probability of an anomaly in the evaluation set is determined. As discussed above, divergence estimator 216 estimates probability of an anomaly in the evaluation set by comparing distribution of internal representation 214 to multivariate unit normal 502. FIG. 9 is a flowchart of a method 900 for estimating divergence, according to an embodiment, and is described below.

Figure 10:
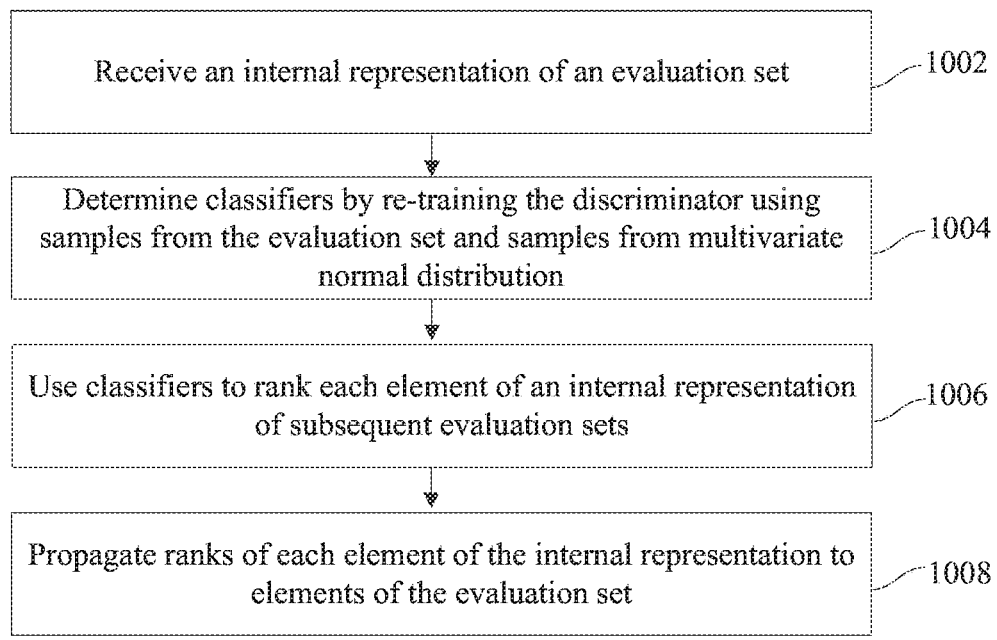
FIG. 10 is a flowchart of a method for determining whether each element of the evaluation set belongs to an anomaly, according to an embodiment.

At operation 808, the probability of an element in a data set belonging to an anomaly is determined. As discussed above, discriminator 208 may rank probability of each element of internal representation 214 of the evaluation set, while decoder 212 propagates the rank to elements 204 of the evaluation set. Based on the value of the rank, anomaly decoder 212 determines the probability of each element 204 in data set 202 being an anomaly. FIG. 10 is a flowchart 1000 of a method for determining whether each element 204 of the evaluation set belongs to an anomaly, according to an embodiment.

FIG. 9 is a flowchart of a method 900 for estimating divergence, according to an embodiment. Method 900 may be performed using hardware and/or software components described with respect to FIGS. 1-6. Note that one or more of the operations may be deleted, combined, or performed in a different order as appropriate.

At operation 902, a multivariate unite normal is received. For example, divergence estimator 216 receives multivariate unite normal 502 that discriminator 208 generated during training.

At operation 904, an internal representation of an evaluation set is received. For example, divergence estimator 216 receives internal representation 214 of the evaluation set generated using the trained encoder 210.

At operation 906, a divergence estimate for each axis of internal representation is determined. For example, divergence estimator 216 generates divergence estimates 508A-D. Each divergence estimate in divergence estimates 508A-D is an estimate between each axis 506A-D of internal representation 214 and the corresponding univariate unit normal 502A-D of multivariate unit normal 502. As discussed above, divergence estimator 216 may use Kolmogorov-Smirnov statistics to determine divergence, or other "goodness-of-fit" statistics that can summarize discrepancy between values. If divergence exists, then the axis of axes 506 of internal representation 214 that has a discrepancy is anomalous. If divergence does not exist, then there is no anomaly.

At operation 908, divergence for an evaluation set is determined. For example, divergence estimator 216 combines divergence estimates 508A-D for each anomalous axis 502 into divergence estimate 510. To combine divergence estimates 508A-D into divergence estimate 510, divergence estimator 216 may use a p-norm function or a maximum norm function in some embodiments.

FIG. 10 is a flowchart 1000 of a method for determining whether each element of the evaluation set belongs to an anomaly, according to an embodiment. Method 1000 may be performed using hardware and/or software components described with respect to FIGS. 1-6. Note that one or more of the operations may be deleted, combined, or performed in a different order as appropriate.

At operation 1002, an internal representation of an evaluation set is received. For example, discriminator 208 receives internal representation 214 of evaluation set that is generated by encoder 210.

At operation 1004, a discriminator is re-trained to determine classifiers. For example, discriminator 208 is re-trained to distinguish between the projection of internal representation 214 of the evaluation set and multivariate normal distribution 402. To re-train, discriminator 208 uses samples from internal representation 214 from the evaluation set and samples from multivariate normal distribution of the same dimension. As discussed above, samples from internal representation 214 may be assigned label=1 and samples from multivariate normal distribution 402 may be assigned a label=0. During re-training, discriminator 208 generates classifiers 604 that identify whether the source of data is from internal representation 214 of evaluation set or multivariate normal distribution.

At operation 1006, internal representation of subsequent evaluation sets is ranked. For example, discriminator 208 uses classifiers 604 determined in operation 1004 to generate rank 606 for each element in internal representation 214. Rank 606 identifies probability of the element in internal representation 214 being anomalous or non-anomalous. For example, when rank 606 for an element is close to one (e.g., more than 0.5 or another threshold), discriminator 208 determines that the element likely belongs to an anomaly. If rank 606 of an element is close to zero (e.g., less than 0.5 or another threshold), discriminator 208 determines that the element likely does not belong to an anomaly.

At operation 1008, the rank of each element in internal representation of the evaluation set is propagated to the elements 204 of the evaluation set. For example, decoder 212 may receive rank 606 for each element of internal representation 214. Decoder 212 may assign rank 606 of elements of internal representation 214 to elements 204 of the evaluation set that correspond to the element in internal representation 214.

Figure 11:
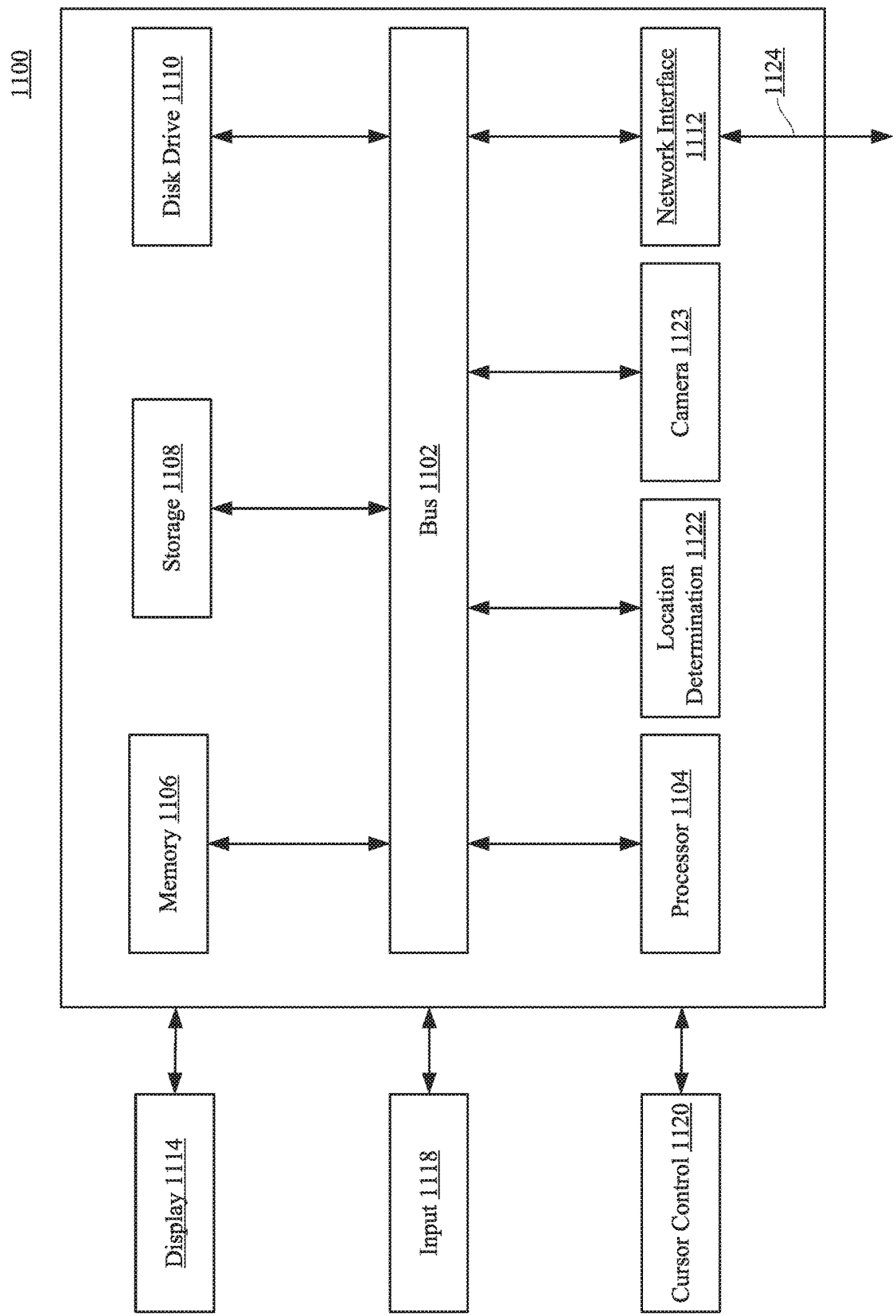
FIG. 11 is a block diagram of a computer system suitable for implementing one or more components in FIGS. 1-10, according to an embodiment.

Referring now to FIG. 11 an embodiment of a computer system 1100 suitable for implementing, the systems and methods described in FIGS. 1-10 is illustrated.

In accordance with various embodiments of the disclosure, computer system 1100, such as a computer and/or a server, includes a bus 1102 or other communication mechanism for communicating information, which interconnects subsystems and components, such as a processing component 1104 (e.g., processor, micro-controller, digital signal processor (DSP), graphics processing unit (GPU), etc.), a system memory component 1106 (e.g., RAM), a static storage component 1108 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), a location determination component 1122 (e.g., a Global Positioning System (GPS) device as illustrated, a cell tower triangulation device, and/or a variety of other location determination devices known in the art), and/or a camera component 1123. In one implementation, the disk drive component 1110 may comprise a database having one or more disk drive components.

In accordance with embodiments of the disclosure, the computer system 1100 performs specific operations by the processor 1104 executing one or more sequences of instructions contained in the memory component 1106, such as described herein with respect to the mobile communications devices, mobile devices, and/or servers. Such instructions may be read into the system memory component 1106 from another computer readable medium, such as the static storage component 1108 or the disk drive component 1110. In other embodiments, hard-wired circuitry may be used in place of or in combination with software instructions to implement the disclosure.

Logic may be encoded in a computer readable medium, which may refer to any medium that participates in providing instructions to the processor 1104 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1110, volatile media includes dynamic memory, such as the system memory component 1106, and transmission media includes coaxial cables, copper wire, and fiber optics, including wires that comprise the bus 1102. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 1100. In various other embodiments of the disclosure, a plurality of the computer systems 1100 coupled by a communication link 1124 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 1100 may transmit and receive messages, data, information and instructions, including one or more programs (i.e., application code) through the communication link 1124 and the network interface component 1112. The network interface component 1112 may include an antenna, either separate or integrated, to enable transmission and reception via the communication link 1124. Received program code may be executed by processor 1104 as received and/or stored in disk drive component 1110 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:
   a non-transitory memory storing instructions; and
   one or more hardware processors coupled to the non-transitory memory and configured to read the instructions from the non-transitory memory to cause the system to perform operations comprising:
      providing a multivariate unit normal of a training set, wherein the multivariate unit normal of the training set is based on an internal representation of the training set generated by an encoder of an auto-encoder and constrained to a multivariate normal distribution;
      generating, using a neural network of the auto-encoder, an internal representation of an evaluation set, wherein the internal representation includes a plurality of elements independent from each other and generated from a plurality of elements in the evaluation set;
      determining, using the multivariate unit normal of the training set and the internal representation of the evaluation set, a probability of an anomaly occurring in the evaluation set;
      determining, using a neural network of a discriminator, a probability of each element in the plurality of elements in the internal representation of the evaluation set belonging to the anomaly; and
      determining, using the neural network of the auto-encoder and the probability of each element in the internal representation, a probability that each element in the plurality of elements in the evaluation set belongs to the anomaly.

2. The system of claim 1, wherein the operations further comprise:
   generating, using the neural network of the auto-encoder, the internal representation of the training set; and
   generating using a neural network of a decoder included in the neural network of the auto-encoder, the training set from the internal representation with a loss of data in the generated training set below a configurable threshold.

3. The system of claim 1, wherein the operations further comprise:
   constraining the internal representation of the training set to the multivariate unit normal.

4. The system of claim 3, wherein constraining the internal representation of the training set comprises:
   providing samples from the internal representation of the training set;
   providing samples from the multivariate normal distribution having a same dimension as the internal representation of the training set;
   determining, using the neural network of the discriminator, the internal representation of the training set and the samples of the multivariate normal distribution, a quality of a classification; and
   using the quality of the classification in the neural network of the auto-encoder to re-generate the internal representation of the training set.

5. The system of claim 1, wherein determining, using the multivariate unit normal and the internal representation of the evaluation set, the probability of the anomaly in the evaluation set, comprises:
   determining a divergence estimate between each axis in the internal representation of the evaluation set and a corresponding univariate unit normal of the multivariate unit normal; and
   combining the divergence estimates for each axis, wherein the divergence estimate indicates the probability of the anomaly.

6. The system of claim 1, wherein the operations further comprise:
   re-training the neural network of the discriminator using the internal representation of the evaluation set, wherein the re-training generates classifiers for the neural network of the discriminator.

7. The system of claim 6, wherein the operations further comprise:
   ranking, using the classifiers of the neural network of the discriminator, each element of the internal representation of the evaluation set, wherein a rank of each element identifies the probability of each element belonging to the anomaly.

8. The system of claim 7, wherein the operations further comprise:

propagating, using a neural network of a decoder, the rank of each element of the internal representation to one or more elements in the evaluation set, wherein the rank of the one or more elements identifies the probability of the one or more elements belonging to the anomaly.

9. The system of claim 1, wherein the internal representation of the evaluation set has a same dimension as the multivariate unit normal.

10. The system of claim 1, wherein the evaluation set includes transactions, and the plurality of elements are attributes of the transactions.

11. A method, comprising:

generating, using an encoder of a neural network of an auto-encoder, an internal representation of a training set, wherein elements of the internal representation are independent of each other, and wherein a first element in the elements includes one or more elements of the training set;

generating a multivariate unit normal of the internal representation of the training set by constraining the internal representation to a multivariate normal distribution;

regenerating, using a decoder of the neural network of the auto-encoder, regenerated elements in the training set from the internal representation, wherein an information loss to the elements in the training set before and after the regenerating is below a configurable threshold; and once the decoder is operable to regenerate the elements in the training set with the information loss below the configurable threshold, using the multivariate unit normal of the internal representation of the training set and an internal representation of an evaluation set passed through the encoder neural network to detect anomalies in the evaluation set that includes a plurality of anomalous transactions.

12. The method of claim 11, wherein a neural network of a discriminator constrains the internal representation of the training set to a multivariate unit normal.

13. The method of claim 12, further comprising:

receiving, at the discriminator, samples of the internal representation of the training set;

receiving, at the discriminator, samples of the multivariate normal distribution of a same dimension as the internal representation;

determining, using the samples of the internal representation of the training set and the samples of the multivariate normal distribution, a quality of classification; and using the quality of classification to regenerate the internal representation of the training set until the internal representation is constrained to the multivariate unit normal.

14. The method of claim 11, wherein a dimension of the internal representation is a number of elements in the internal representation.

15. An anomaly detection system, comprising:

a non-transitory memory storing instructions; and one or more hardware processors coupled to the non-transitory memory and configured to read the instructions from the non-transitory memory to cause the system to perform operations comprising:

providing a multivariate unit normal of a training set, wherein the multivariate unit normal of the training set is based on an internal representation of the training set generated by an encoder of an auto-encoder and constrained to a multivariate normal distribution;

generating, using a neural network of the encoder, an internal representation of an evaluation set, wherein the internal representation includes a plurality of elements independent of each other and each element in the plurality of elements is generated from one or more elements of the evaluation set;

determining, using the multivariate unit normal of the training set and the internal representation of the evaluation set, a probability of an anomaly occurring in the evaluation set;

determining, using a neural network of a discriminator, a probability of each element in the plurality of elements of the internal representation of the evaluation set belonging to the anomaly; and determining, using a neural network of a decoder and the probability of each element in the internal representation belonging to the anomaly, a probability of one or more element in the evaluation set belonging to the anomaly.

16. The system of claim 15, wherein determining, using the multivariate unit normal and the internal representation of the evaluation set, the probability of the anomaly in the evaluation set, comprises:

determining a divergence estimate between each axis in the internal representation of the evaluation set and a corresponding univariate unit normal of the multivariate unit normal; and combining divergence estimates for each axis, wherein the divergence estimate indicates the probability of the anomaly.

17. The system of claim 15, wherein the operations further comprise:

re-training the neural network of the discriminator using the internal representation of the evaluation set, wherein the re-training generates classifiers for the neural network of the discriminator.

18. The system of claim 17, wherein the operations further comprise:

ranking, using the classifiers for the neural network of the discriminator, each element of the internal representation of the evaluation set, wherein a rank of each element identifies the probability of each element belonging to the anomaly.

19. The system of claim 18, wherein the operations further comprise:

propagating, using the neural network of the decoder, the rank of each element of the internal representation to the one or more elements in the evaluation set.

20. The system of claim 16, wherein the internal representation of the evaluation set has a same dimension as the multivariate unit normal.

* * * * *